United States Patent
Deguchi et al.

Patent Number: 5,754,523
Date of Patent: May 19, 1998

[54] OPTICAL MEMORY MEDIUM WITH PREFORMED PIT ARRANGEMENT

[75] Inventors: Toshihisa Deguchi, Nara; Kenji Ohta, Nara-ken; Akira Takahashi, Nara; Kazuo Van, Nara; Michinobu Mieda, Tenri; Tetsuya Inui, Nara, all of Japan

[73] Assignee: Sharp Kabushiki Kaisha, Osaka, Japan

[21] Appl. No.: 534,300

[22] Filed: Sep. 27, 1995

Related U.S. Application Data

[62] Division of Ser. No. 304,810, Sep. 13, 1994, Pat. No. 5,477,524, which is a continuation of Ser. No. 793,294, Nov. 14, 1991, abandoned, which is a continuation of Ser. No. 273,250, Nov. 18, 1988, abandoned.

[30] Foreign Application Priority Data

| Nov. 18, 1987 | [JP] | Japan | 62-291186 |
| Nov. 18, 1987 | [JP] | Japan | 62-291187 |
| Dec. 25, 1987 | [JP] | Japan | 62-332647 |

[51] Int. Cl.[6] .................................................. G11B 7/24
[52] U.S. Cl. ............................. 369/275.4; 369/275.1
[58] Field of Search ........................ 369/275.4, 275.1, 369/275.3, 109, 110, 284, 286, 235.5, 275.2, 277, 278

[56] References Cited

U.S. PATENT DOCUMENTS

| 4,383,311 | 5/1983 | Ettenberg | 369/275.4 |
| 4,443,870 | 4/1984 | Hazel et al. | 369/275.3 |
| 4,646,103 | 2/1987 | Sugiyama et al. | 369/109 |
| 4,761,775 | 8/1988 | Murakami | 369/275.3 |
| 4,858,221 | 8/1989 | Romeas | 369/275.4 |
| 4,910,725 | 3/1990 | Drexler et al. | 369/275.1 |
| 4,947,384 | 8/1990 | Suzuki et al. | 369/275.1 X |
| 4,949,331 | 8/1990 | Maeda et al. | 369/275.3 |
| 5,268,887 | 12/1993 | Honguh et al. | 369/44.13 |
| 5,477,524 | 12/1995 | Deguchi et al. | 369/275.1 |

FOREIGN PATENT DOCUMENTS

| 0164131 | 12/1983 | European Pat. Off. . |
| 10193614 | 9/1985 | European Pat. Off. . |
| 0210330 | 3/1986 | European Pat. Off. . |
| 0178116 | 4/1986 | European Pat. Off. . |
| 02420478 | 10/1987 | European Pat. Off. . |
| 0242078 | 10/1987 | European Pat. Off. . |
| 2504301 | 4/1981 | France . |
| 0201093 | 5/1986 | Germany . |
| 620301 | 1/1987 | Germany . |
| 60-157740 | 1/1984 | Japan . |
| 61-216126 | 9/1986 | Japan . |
| 62-110637A | 5/1987 | Japan . |
| 62-120644A | 6/1987 | Japan . |
| 63-44332 | 2/1988 | Japan . |
| 63-255846 | 10/1988 | Japan . |
| 0150247 | 6/1989 | Japan . |

OTHER PUBLICATIONS

On–land Composite Pregroove Method for High Track Density Recording by Tsuneda et al.
"Developments in Optical Disk Mastering" by Jan H. T. Pasman et al. SPIE vol. 529 Optical Mass Data Storage (1985) pp. 62–68.

*Primary Examiner*—Ali Neyzari

[57] ABSTRACT

In an optical memory medium comprising prepits on which a light spot is impinged to obtain information and, if required, guide grooves: each of those among the prepits which are longer than the diameter of the light spot consists of a series of pit portions and unpitted portions; each of the prepits is sandwiched between two of the discontinuous portions of guide grooves adjacent to each other; the guide grooves have one or more narrow portions, and each of the prepits is sandwiched between two of the narrow portions of guide grooves adjacent to each other; or the guide grooves have one or more long portions, one or more short portions, and narrow portions formed between the long and short portions, and each of the prepits is sandwiched between two of the short portions of guide grooves adjacent to each other.

19 Claims, 11 Drawing Sheets

- - - - PRIOR ART
——— EXAMPLE 1

INTENSITY OF
REFLECTED LIGHT

POSITION OF LIGHT SPOT

UNPITTED PORTION

FIG.12B

PIT PORTION

OPTICAL MEMORY MEDIUM WITH PREFORMED PIT ARRANGEMENT

This application is a divisional of application Ser. No. 08/304,810, filed on Sep. 13, 1994 now U.S. Pat. No. 4,577,524 filed Dec. 19, 1995, which is a Rule 62 Continuation of Ser. No. 07/793,294 filed on Nov. 14, 1991 now abandoned, which is a Rule 62 Continuation of Ser. No. 07/273,250 filed Nov. 18, 1988 now abandoned, the entire contents of which are hereby incorporated by reference.

BACKGROUND OF THE INVENTION

1. Field of the Invention

This invention relates to an optical memory medium with which information can be optically recorded and reproduced or erased. More particularly, it relates to an improved preformat of an optical memory medium.

2. Description of the Prior Art

In recent years, with the development of information processing systems, inexpensive large capacity memories have been required. To meet this requirement, various optical memory systems have been developed. Such optical memory systems are roughly classified into three categories: read-only type; write once type; and rewritable type.

In a write once or a rewritable optical memory medium information is recorded, reproduced or erased by irradiating a light beam such as a laser beam along tracks (hereinafter, referred to as "recording tracks"). In order to accurately guide a laser spot to an objective position of the optical disk, grooves for guiding the laser spot (hereinafter, referred to as "guide grooves") and pits for prerecorded information are preformed on a glass or plastic substrate; Such pits are called "prepits". The information recorded in the prepits includes generally the track address of a recording track and synchronizing signals for detecting said information. When a recording track is divided into sectors, the prerecorded information also includes the sector address.

Figure 11A:
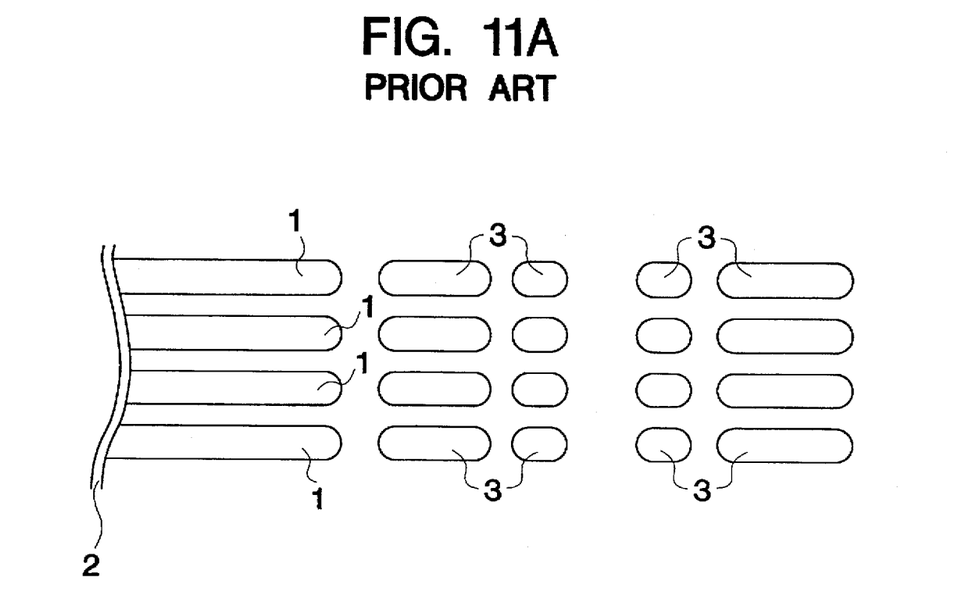
FIG. 11A is a plan view showing the preformat portion of a conventional optical memory medium.

An example of the preformat portion in a prior art optical memory medium is diagrammatically shown in FIG. 11A. In the exemplified configuration, guide grooves 1 are formed concentrically or spirally on the surface of a substrate 2 and the information is recorded on said guide grooves 1, Prepits 3 having a variety of lengths are formed in alignment with the guide grooves 1. Then, a recording layer made of a suitable material is formed by a vacuum deposition, spattering method or spin coating method. Then, the substrate is covered by a protective substrate, or applied with a hard coating composition is applied, to obtain an optical memory medium.

Figure 6A:
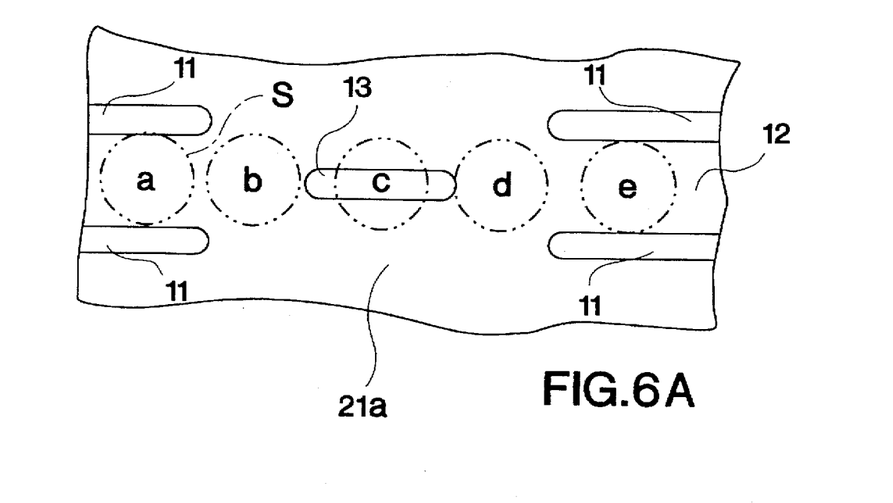
FIG. 6A is a plan view showing a modified preformat of the second embodiment.
Figure 6B:
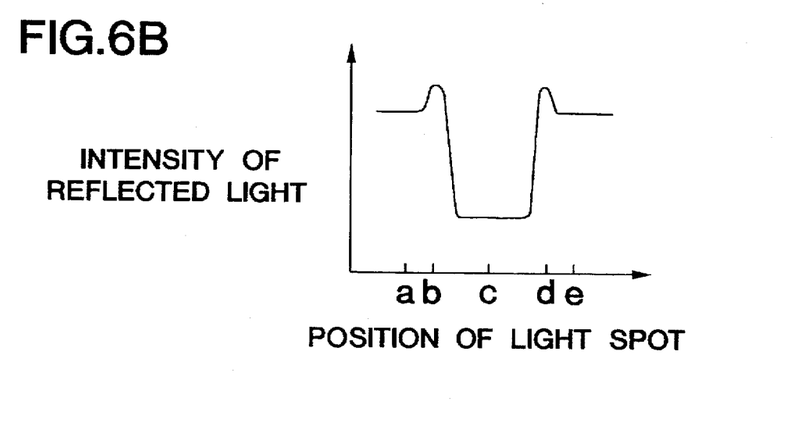
FIG. 6B is a graph showing the relation between the intensity of the reflected light beam and the position of the light spot in the embodiment of FIG. 6A.
Figure 11B:
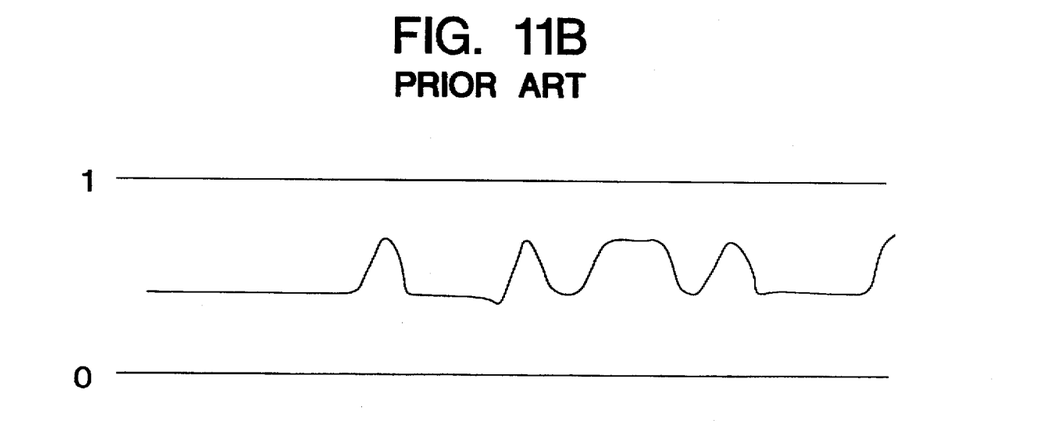
FIG. 11B is a graph showing the variation of the intensity of the reflected light beam obtained from the optical memory medium of FIG. 1A.
Figures 12A, 12B:
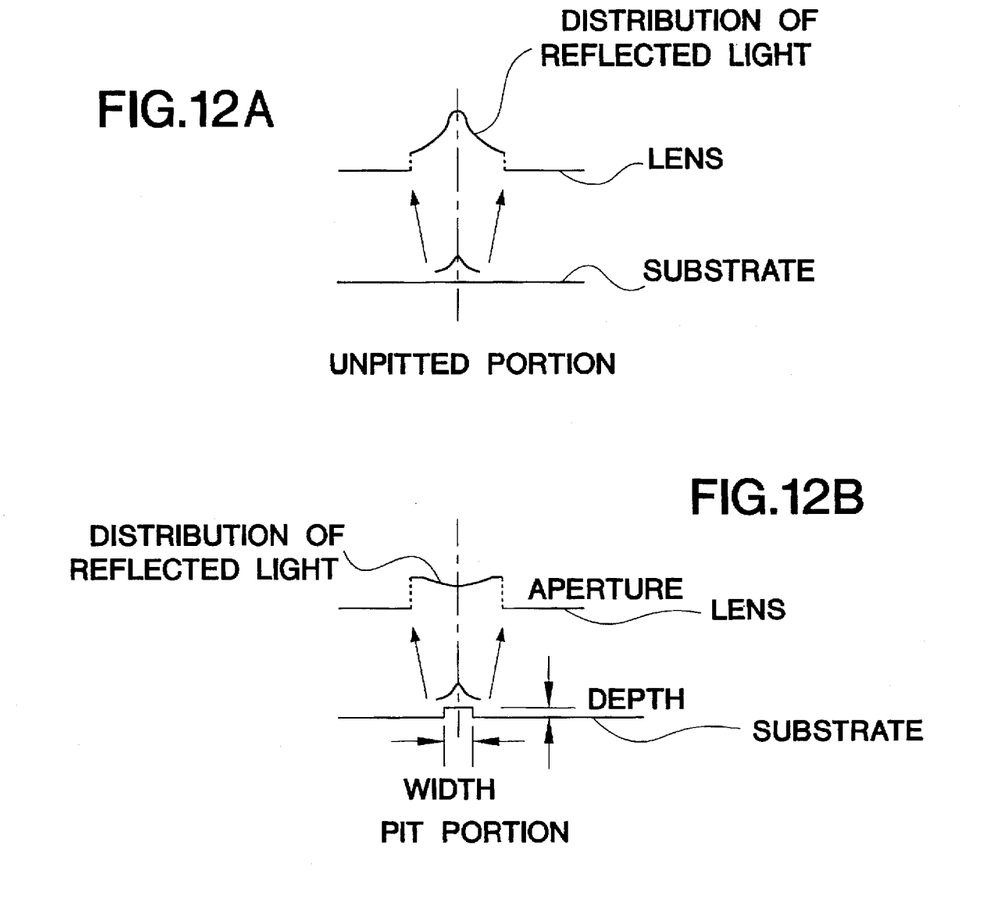
FIGS. 12A and 12B illustrate a change of diffraction pattern difference between the light beam reflected from an pitted portion and that reflected from a pitted portion.

When the guide grooves 1 and prepits 3 are scanned by a laser spot, signals having the waveform as shown in FIG. 11B are obtained from the reflected light beam. The obtained signals are modulated in accordance with the lengths of the prepits 3. The signals will be demodulated and binary coded by setting an appropriate slice level. It is known that the modulated signals are closely related to the physical structure of the prepits 3. FIGS. 6A and 6B diagrammatically illustrate that the reflected light beam from the optical recording medium is vignetted in an object lens of a reading/recording apparatus, due to the diffraction effect in the pit portions and the unpitted portions. As seen from FIGS. 12A and 12B, there exists a pattern difference of the intensity between the light beam reflected from an unpitted portion (FIG. 12A) and that reflected from a pitted portion (FIG. 12B). Hence, the strength distribution of the reflected light beam is changed to produce the variation in the light intensity passing through the object lens.

Figure 13:
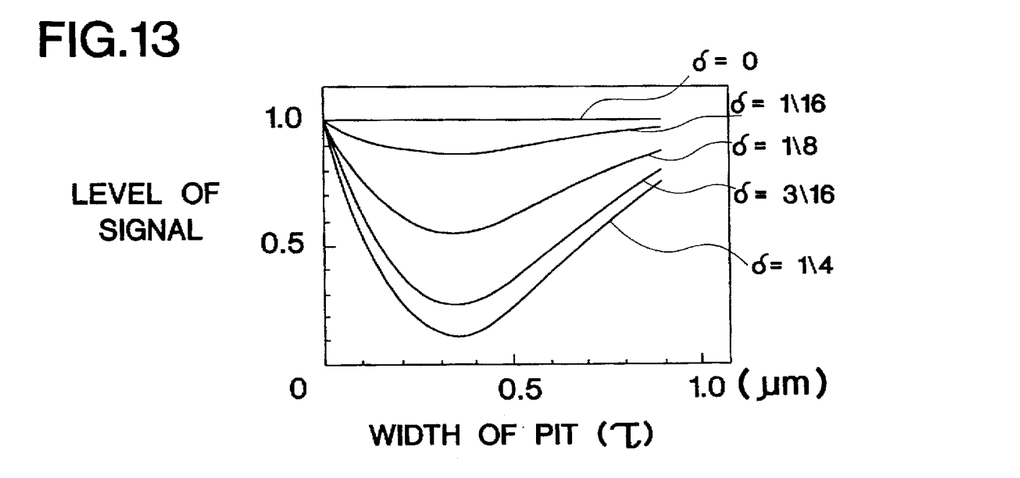
FIG. 13 is a graph showing the relation between a pit width and a signal levels

FIG. 13 shows the relation between the pit widths $\tau$ which are normalized by the diameter of the light spot ($P \times 1/e^2$; the diameter at which the light strength is $1/e^2$ times of the peak strength) and the signal levels obtained from prepits which are longer than the diameter of the light spot, using the depth $\epsilon$ normalized to the wavelength of the light spot as a parameter. In FIG. 13, the signal levels of the reflected beams are plotted in relation to the signal level obtained from unpitted portions. From FIG. 13, it will be seen that the degree of the deflection or the modulation of the reflected light beam is greatest when the width of the prepits is approximately 0.32 times of the diameter of the light spot. Therefore, the prepits are formed so that their width becomes as close to this value as possible.

Figure 14:
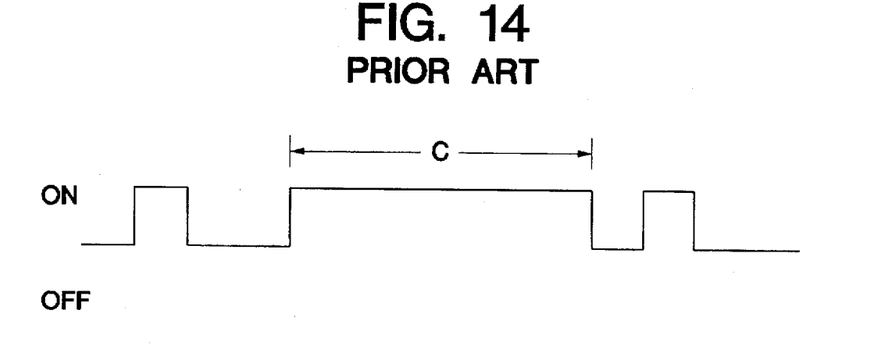
FIG. 14 is a diagram showing a signal obtained from a conventional optical memory medium.

Considering these properties, a substrate for an optical memory medium is produced as follows. A photoresist is applied to a glass substrate, and the substrate is exposed by scanning a laser beam of a short wavelength such as an Ar laser which is modulated in accordance with a coded signal of the information to be prerecorded. The portions exposed to the laser beam are removed by developing, to form prepits or grooves. Using the obtained original glass substrate as a master, the pattern of the original substrate is transferred to a glass or plastic substrate, to obtain a substrate for an optical memory mediums. In a section C corresponding to a long prepit, the coded signal has square pulses produced continuously (FIG. 14).

In the above-described process of producing the original substrate it often happens that uneven exposure, developing time and transfer cause a fluctuation in the width of the prepits or grooves of an optical recording medium, resulting in the disturbance of the signal reproduced from the prepits.

Figure 15A:
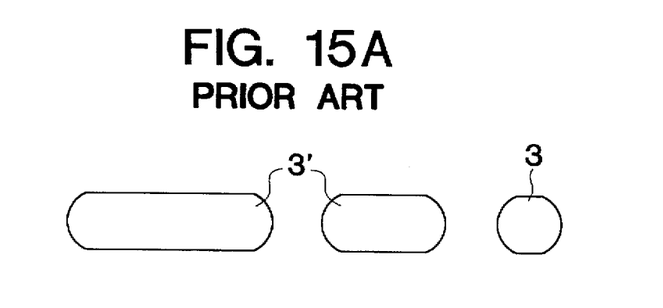
FIG. 15A illustrates prepits formed in a conventional optical memory medium.
Figure 15B:
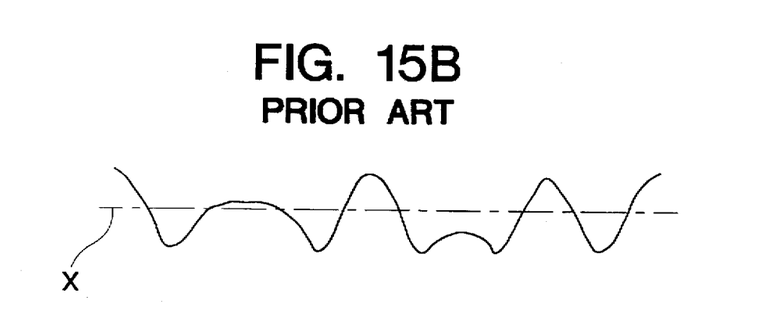
FIG. 15B is a diagram showing a signal obtained from the prepits of FIG. 15A.

For example, the waveform obtained from long prepits 3' having a large width (FIG. 15A) is markedly distorted as shown in FIG. 15B. This possibly causes the erroneous detection of the edges of the pulses when binary-coding the data, resulting in misreading of address information or the like. The distorted waveform is likely to occur in the mid portion of a prepit where the width is large, rather than in the edge portions where the width is gradually increased or decreased. This is because the diffraction efficiency is lowered in the mid portion, and this appears remarkably when scanning a long prepit.

As described above, the control of the width of a prepit which is longer than the diameter of a light spot in producing an original substrate has a great influence on the restraint of the distortion of the reproduced signal in an optical memory medium. Hence, the structure of a conventional optical memory medium requires the fine control of the exposure conditions in producing the original substrate and also a precise control of accuracy in the transfer process, providing an obstacle to the improvement of the yield.

Figure 16:
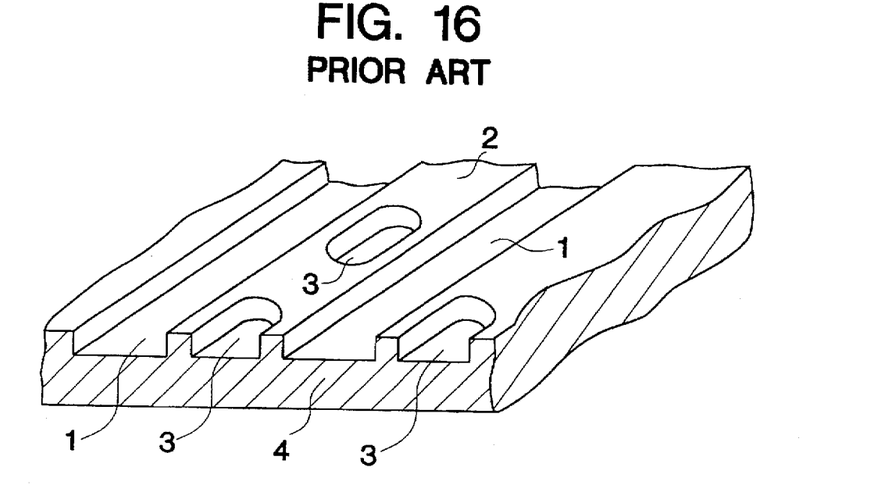
FIG. 16 is a perspective view showing another conventional optical memory medium.

Another example of the preformat portion in a prior art optical memory medium is shown in FIG. 16. In the optical memory medium of FIG. 16, guide grooves 1 are formed on a substrate 4, and a record track 2 is formed between guide grooves 1 adjacent to each other. The information such as a track address is prerecorded in the form of prepits 3 formed on the record track 2. The width and depth of the guide grooves 1 have a large effect on the track count signal property for a high speed access operation, and on the track servo property for retaining a light spot on the record track 2. Consequently, the width of the guide grooves 1 is set within the range from about 0.3 μm to about 0.5 μm.

Figure 17A:
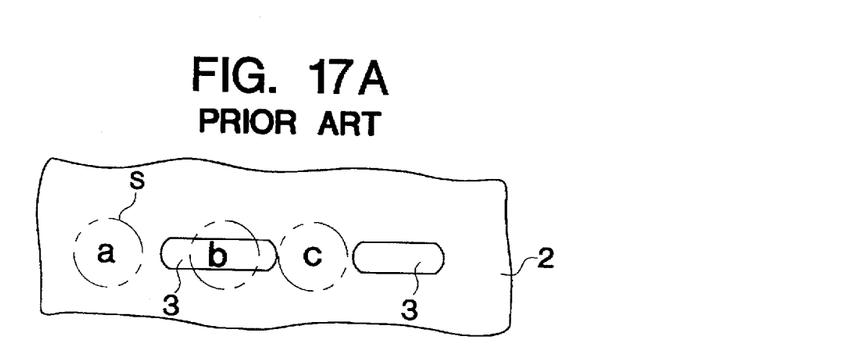
FIG. 17A is a plan view of prepits in the theoptical memory medium of FIG. 16.
Figure 17B:
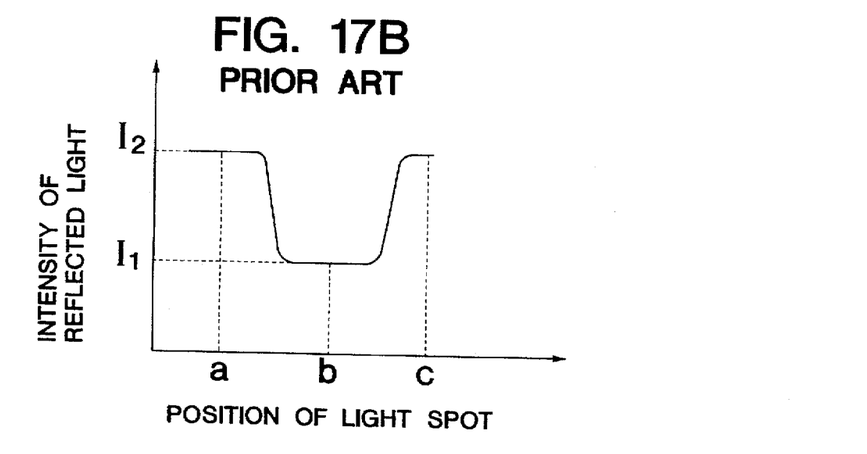
FIG. 17B is a graph showing the variation of the intensity of the reflected light beam obtained from the prepits of FIG. 17A.

The prerecorded information is read out using the diffraction in the prepits 3. When a light spot moves from a to c as shown in FIG. 17A, the reflected light's intensity changes as shown in FIG. 17B. In FIG. 17B, $I_1$ is the reflected light intensity obtained when the light spot is on the prepits 3, and $I_2$ is the reflected light intensity obtained when the light spot is on a portion other than the prepits 3. The information is read out based on the difference between the light intensities $I_1$ and $I_2$. Therefore, the quality of the reproduced signal depends on the degree of the difference between the light intensities $I_1$ and $I_2$.

Because, as described above, the information is prerecorded in the form of prepits 3 formed on the record track 2 disposed between two guide grooves 1, the properties of the information signal which is read out from prepits 3 are greatly affected by the width and/or depth of the guide grooves 1. When the width of the guide grooves 1 is set to be 0.3 μm to 0.5 μm as stated above, the diffraction efficiency in the prepits 3 is lowered so that the difference between the light intensities becomes small, resulting in that a reproduced signal of high quality cannot be obtained from the prepits 3.

SUMMARY OF THE INVENTION

The optical memory medium of this invention, which overcomes the above-discussed and numerous other disadvantages and deficiencies of the prior art, comprises prepits on which a light spot is impinged to obtain information, wherein each of those among said prepits which are longer than the diameter of the light spot consists of a series of pit portions and unpitted portions.

The optical memory medium comprises guide grooves and prepits, said guide grooves are formed discontinuously, and each of said prepits is sandwiched between two of the discontinuous portions of guide grooves adjacent to each other.

In a preferred embodiment, the discontinuous portions are longer than the prepit which is sandwiched between said discontinuous portions.

The optical memory medium comprises guide grooves and prepits, said guide grooves have one or more narrow portions, and each of said prepits is sandwiched between two of said narrow portions of guide grooves adjacent to each other.

The optical memory medium comprises guide grooves and prepits, said guide grooves are formed discontinuously and have one or more narrow portions, and some of said prepits are sandwiched between two of the discontinuous portions of guide grooves adjacent to each other, and the other of said prepits are sandwiched between two of said narrow portions of guide grooves adjacent to each other.

In a preferred embodiment, the narrow portions are longer than the prepit which is sandwiched between said narrow portions.

The optical memory medium comprises guide grooves and prepits, said guide grooves have one or more long portions, one or more short portions, and unpitted portions formed between said long and short portions, and each of said prepits is sandwiched between two of said short portions of the guide grooves adjacent to each other.

The optical memory medium comprises guide grooves and prepits, said guide grooves have one or more long portions, one or more short portions, and narrow portions formed between said long and short portions, and each of said prepits is sandwiched between two of said short portions of guide grooves adjacent to each other.

In one aspect of the invention, it is possible to impede a steep change in the diffraction efficiency between the end and mid portions of the prepits even when uneven exposure, uneven developing time or uneven transfer has occurred in the production process of the original substrate. Therefore, the present optical memory medium can prevent the reproduced signal from being distorted, so that a signal of high quality can be reproduced. In other words, the optical memory medium of the invention can surely provide a reproduced signal which is well comparable in quality to that of a conventional medium which has long prepits of an accurately controlled width.

In another aspect of the invention, no guide groove is formed, or narrow guide grooves which have a width smaller than that of the guide grooves disposed in the region where prepits are not formed are formed on the both sides of the prepits. Hence, the diffraction of the irradiated light spot in the prepits is not affected by the guide grooves. On the other hand, the width of the guide grooves disposed in the region where prepits are not formed can be adequately selected considering the track count signal property, track servo signal property or the like. Consequently, the properties of the signals such as the track count signal and track servo signal can be greatly improved.

Thus, the invention described herein makes possible the objectives of (1) providing an optical memory medium from which undistorted signals of prerecorded information can be produced; (2) providing an optical memory medium which can be produced with a high yield; and (3) providing an optical memory medium the original of which can be easily produced.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 1A:
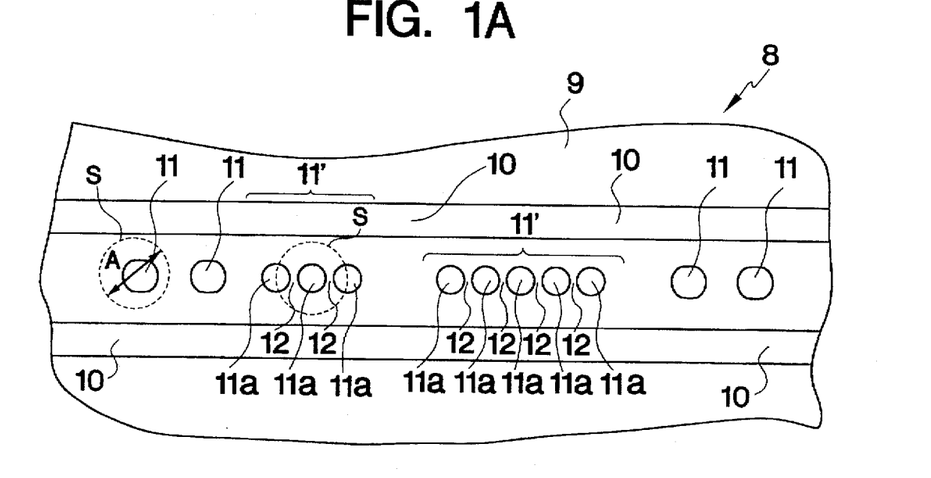
FIG. 1A is a plan view showing the preformat portion of the first embodiment of the invention.
Figure 1B:
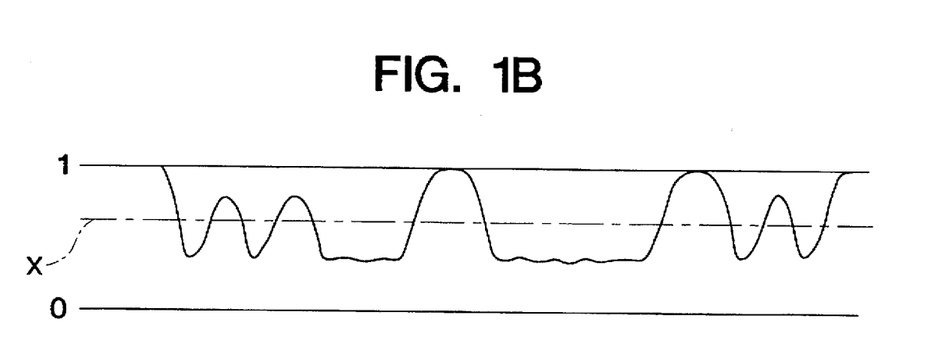
FIG. 1B is a graph showing the variation of the intensity of the reflected light beam obtained from the optical memory medium of FIG. 1A.
Figure 1C:
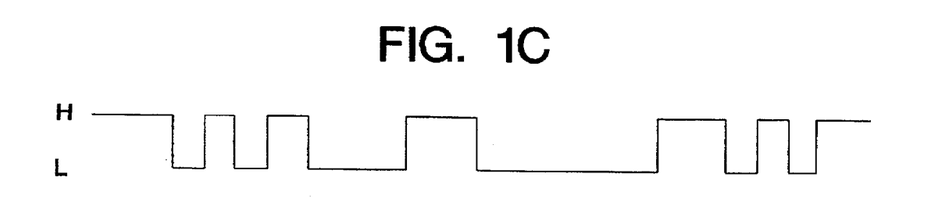
FIG. 1C is a diagram showing the signal obtained from the reflected light beam of FIG. 1B.
Figure 1D:
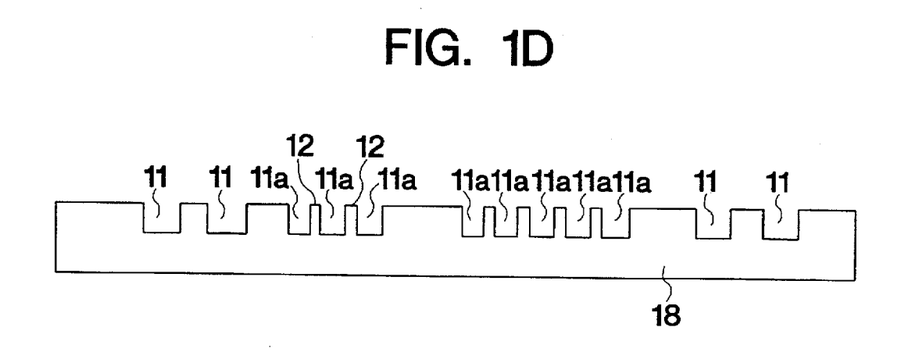
FIG. 1D is a sectional view of the optical memory medium shown in FIG. 1A.

FIG. 1A illustrates diagrammatically an arrangement of prepits in an optical memory medium of the invention. In the optimal memory medium 8 of FIG. 1, a row of prepits 11 and 11' is formed in a substrate 9 to record track address information information. The prepits 11 and 11' are disposed between adjacent generally concentric or spiral guide tracks or grooves 10 formed in the substrate 9 and/or synchronization information. By scanning a laser spot S along the row, such information can be read out from the medium. Among the prepits 11 and 11', each of the prepits 11' having a length greater than the diameter A of the laser spot S to be scanned consists of a series of pit portions 11a and unpitted portions 12. The length or diameter of the pit portions 11a is smaller than the diameter A of the laser spot S. FIG. 1D shows a sectional view of the recording medium with prepits 11 and 11'.

Figure 2:
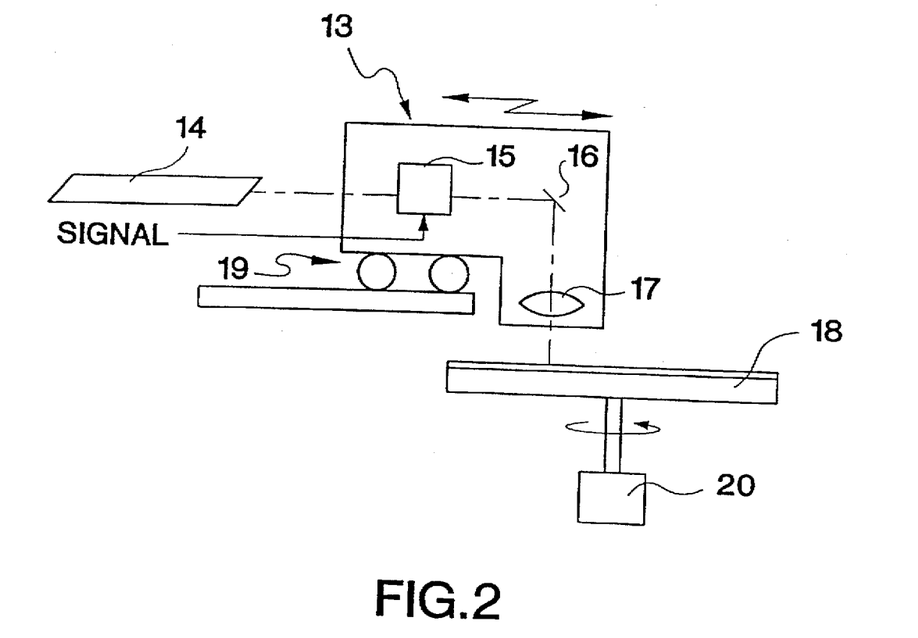
FIG. 2 is a schematic view of an apparatus for producing an original substrate for the optical memory medium of the first embodiment of the invention.

An apparatus for producing an original substrate for an optical memory medium of the invention is shown in FIG. 2. The apparatus 13 shown in FIG. 2 comprises a laser beam source 14 from which a laser beam is emitted to a modulator 15. The modulator 15 receives the laser beam and a signal to be recorded, and modulates the strength of the laser beam in accordance with the signal. The modulated laser beam is transmitted to an object lens 17 via a mirror 16. The laser beam is converged by the lens 17, and impinged on an original substrate. 18, to form a minute focused laser spot on the surface of the substrate. The substrate 18, the surface of which has been applied with a photoresist coating of a predetermined thickness, is rotated by a driving motor 20. The apparatus 13 is provided with a feeder 19 which moves the laser spot in the radial direction of the original substrate 18. By combining the movement of the laser spot and the rotation of the original substrate 18, prepits are formed concentrically or spirally on the original substrate 18.

Figure 3:
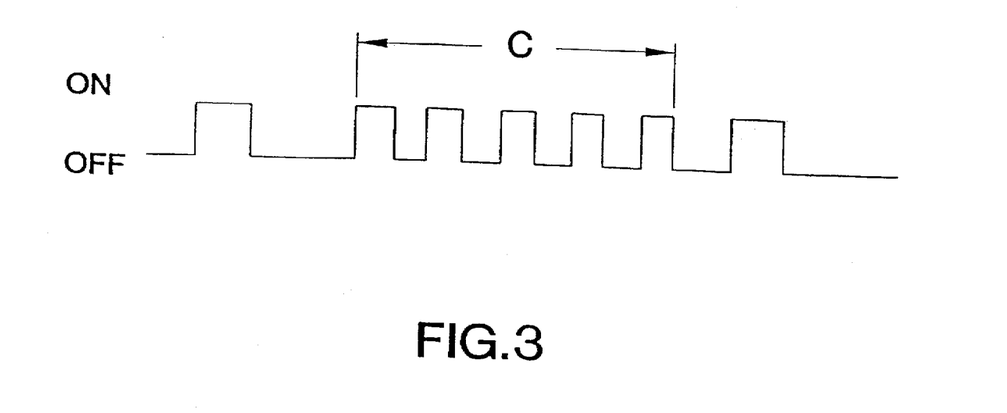
FIG. 3 is a diagram showing a signal supplied to the apparatus of FIG. 2.

The signal input into the modulator 15 has been previously processed by a signal processor (not shown) so that the prepits 11' consist of pit portions 11a and unpitted portions 12. More specifically, the signal which corresponds to the signal C in FIG. 14 is converted into a pulse signal train in which each pulse has a width corresponding to the pit portions 11a and the number of the pulse corresponds to that of the pit portions 11a (FIG. 3).

After being exposed by the apparatus 13, the original substrate 18 is put into developing and etching processes and the exposed portions are etched away so that prepits are formed. Using the substrate 18 thus formed as a master and conducting processes similar to those of producing so-called video disks or compact disks, an optical memory medium preformatted as shown in FIG. 1A can be produced. When scanned along the prepits 11 and 11', a signal having a waveform which is substantially undistorted can be obtained from the portion corresponding to the prepit 11'.

Figure 4:
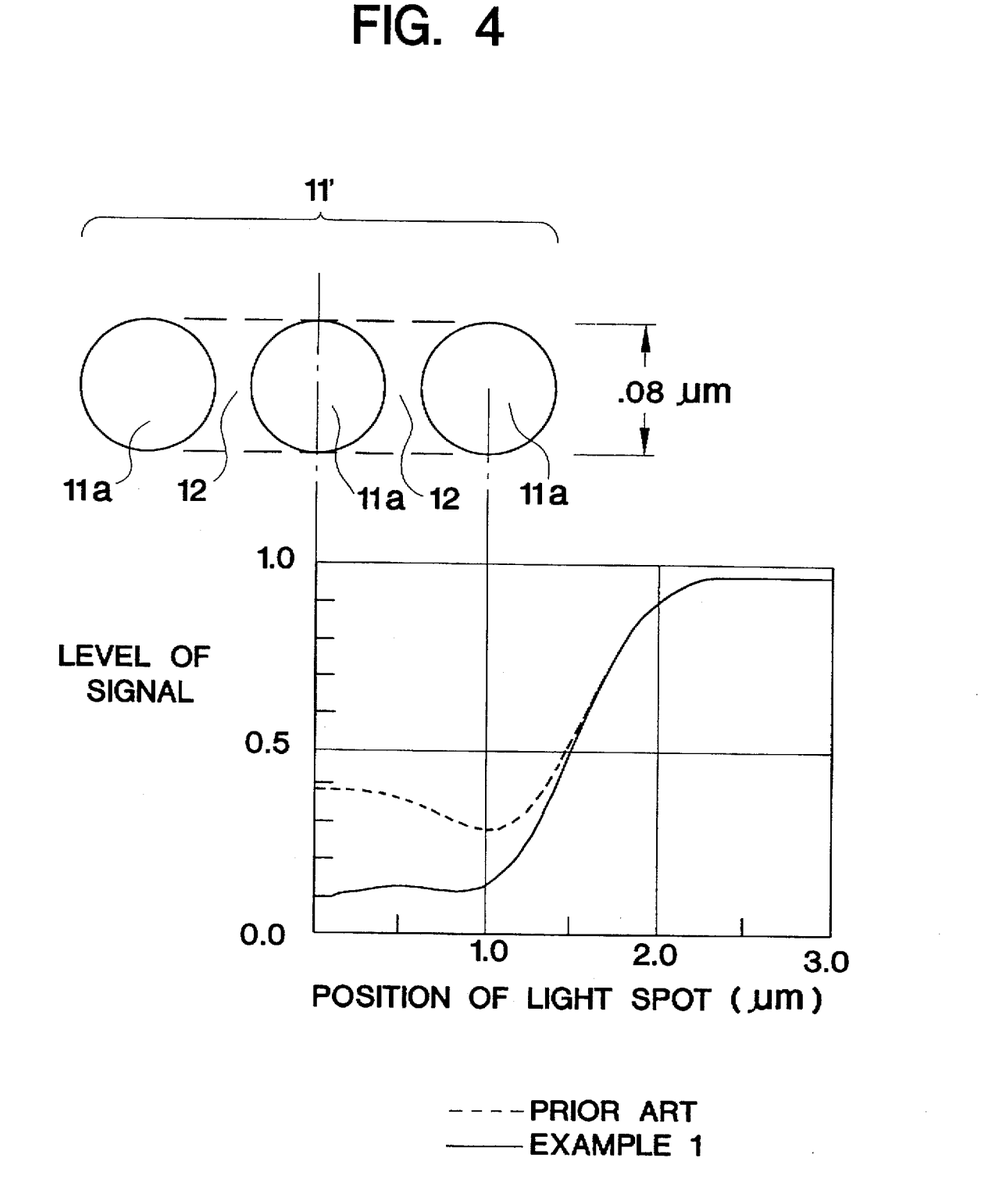
FIG. 4 is a diagram showing a result of an experiment using a conventional optical memory medium and the optical memory medium of FIG. 1.

FIG. 4 shows a result of an experiment which was conducted to simulate the suppression effect of the medium of this example on the distortion of the reproduced signal. In this experiment, a laser spot having the diameter of 1.3 μm was scanned on a conventional optical memory medium having a long prepit which is 2.8 μm in length, 0.8 μm in width and λ/4 (λ is the wavelength of the laser beam) in depth (shown by a broken line in FIG. 14), and also on an optical memory medium according to the invention which has a prepit 11' comprising three prepit portions 11a each having the diameter of 0.8 μm (shown by solid lines in FIG. 4). The prepit portions 11a were arranged in the pitch of 1 μm. In the graph of FIG. 4, the signal level obtained from the conventional medium is shown by a broken line, and that obtained from the present medium by a solid line. As apparent from FIG. 4, the signal obtained from the conventional medium was remarkably distorted in the mid portion of the prepit. In contrast, the signal obtained from the present medium was scarcely distorted.

In this example, the prepits 11a are entirely disconnected. Alternatively, however, the prepits 11a may be directly connected to each other or connected to each other via narrow pit portions.

Example 2

Figure 5:
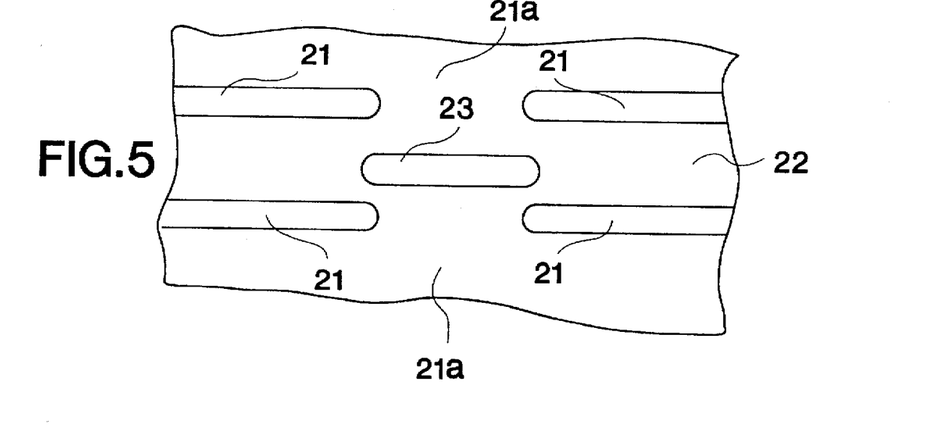
FIG. 5 is a plan view showing the preformat portion of the second embodiment of the invention.

FIG. 5 shows a preformat portion in another optical memory medium according to the invention. In this example, the guide grooves 21 are intermittently formed. The portion 22 between two guide grooves 21 adjacent to each other functions as a record track. In the record track 22, prepits 23 are formed (in FIG. 5, only one prepit is shown). On the both sides of the prepit 23, the guide grooves 21 are not formed. In other words, the guide grooves 21 have a discontinuous portion 21a the length of which is equal to that of the prepit 23 and which is disposed at one side of the prepit 23.

In such an arrangement, the adverse effect of the guide grooves 21 on the diffraction of the light beam in the prior art can be greatly reduced. Accordingly, the diffraction of the light beam impinged on the prepit 23 can be generated more effectively as compared to the conventional optical memory medium in which guide grooves are formed along both sides of the prepits, which results in the high quality reproduced signal having a large amplitude level. Particularly, the quality of the signal obtained from prepits which are longer than the diameter of the light spot can be remarkably improved.

In the region where prepits 23 are not formed, the width of the guide grooves can be adequately selected considering the track count signal property, track servo signal property or the like. Consequently, the properties of the signals such as the track count signal and track servo signal can be greatly improved.

If the discontinuous portion 21a is formed so as to be longer than the prepit 23 and the distance between the prepit 23 and the guide grooves 21 is as great as shown in FIG. 6A, the amplitude of the reproduced signal will be greater because of the following reason. During the scan of a light spot from the point a to the point d, the intensity of the reflected light becomes "High", as shown in FIG. 6B, when the portions b and d (i.e., the portions between the prepits 23 and the guide grooves 21) are scanned. Hence, it is preferable to form the prepit 23 and guide grooves 21 so that the prepits 23 is equal in length to the discontinuous portions 21a or that the prepit 23 is slightly shorter than the discontinuous portions 21a.

Figure 7:
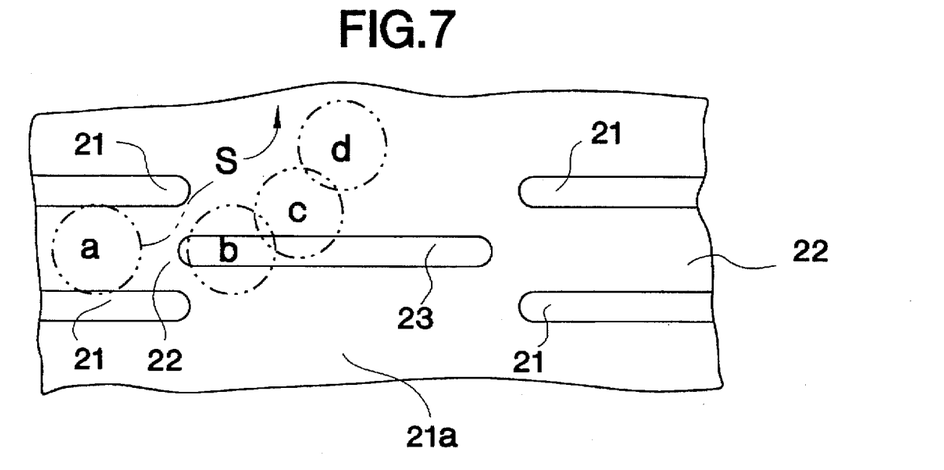
FIG. 7 is a plan view showing another modified preformat of the second embodiment.

If the prepit 23 is too long, a difficulty may arise. Namely, because the discontinuous portions 21a also becomes long, a light spot which is to be scanned along the guide track 22 may deviate from the guide track 22 as shown in FIG. 7. Consequently, it may be preferable to employ the arrangement of this example in an optical memory medium having relatively short prepits.

Example 3

Figure 8:
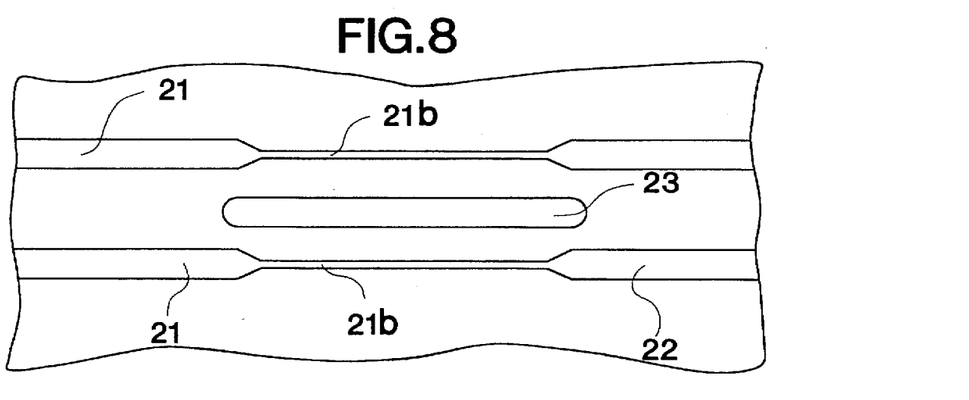
FIG. 8 is a plan view showing the preformat portion of the third embodiment of the invention.

A further example of the optical memory medium according to the invention is illustrated in FIG. 8. In this optical memory medium, guide grooves 21 have a narrow portion 21b. A prepit 23 is formed between two narrow portions 21b of guide grooves 21 which are adjacent to each other.

In the optical memory medium of this example, the above-mentioned difficulty in Example 2 can be obviated because the portions 21b of the guide grooves 21 are positioned at the both sides of the prepit 23. The existence of the narrow portions 21b at the both sides of the prepit 23 slightly lowers the intensity of the reproduced signal, as compared with that obtained from the configuration of Example 2. However, the intensity of the reproduced signal obtained from the optical memory medium of this example is sufficiently great when compared with that obtained from the conventional configuration in which guide grooves have a uniform widths It is possible that the configuration of Example 2 and that of Example 3 are both provided in one optical memory medium.

Example 4

Figure 9A:
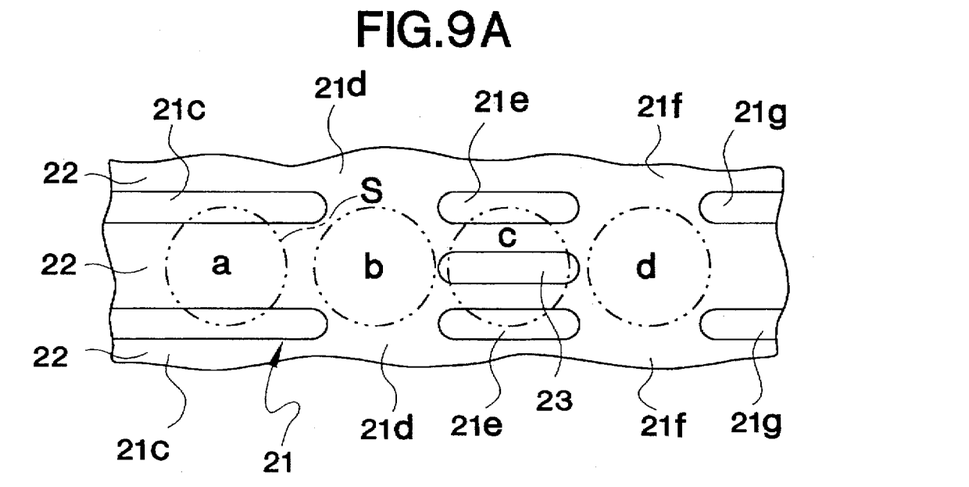
FIG. 9A is a plan view showing the preformat portion of the fourth embodiment of the invention.

The fourth example (FIG. 9A) of the optical memory medium of the invention comprises guide grooves 21 each of which has one or, more series of long portions 21c, a discontinuous portion 21d, a short portion 21e, a discontinuous portion 21f and a long portion 21g. A prepit 23 is formed between the short portions 21e of two guide grooves 21 adjacent to each other.

Figure 9B:
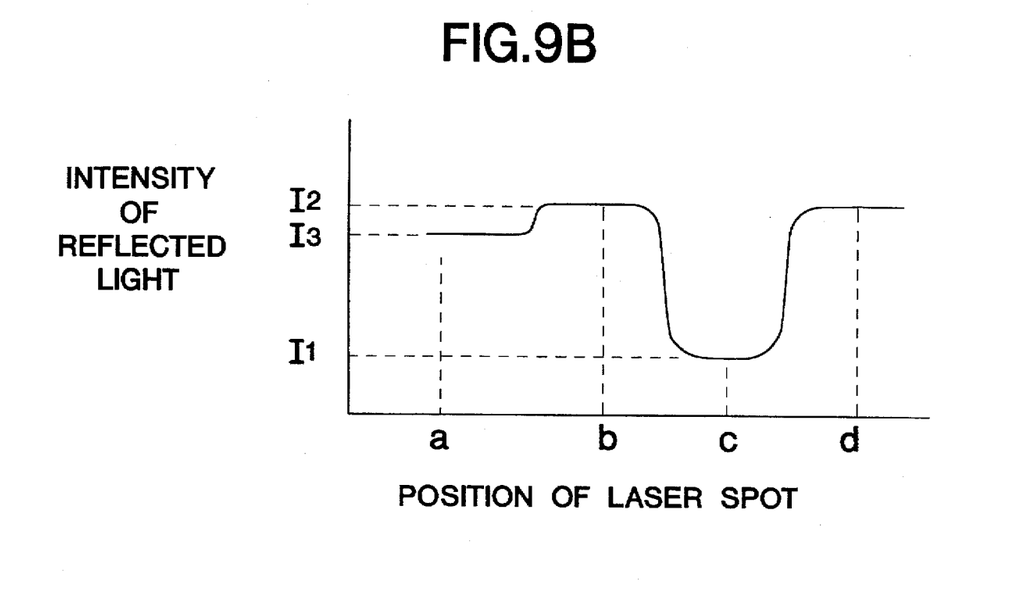
FIG. 9B is a graph showing the relation between the intensity of the reflected light beam and the position of the light spot in the embodiment of FIG. 9A.

FIG. 9B shows the change in the intensity of the reflected light beam when a light spot S is scanned from a point a to a point d on a record track 22 in which the prepit 23 is formed. When the light spot S is at the point a, the intensity is $I_3$. When the light spot S moves to the point b, the intensity increases to the level $I_2$ because there exists no prepit and also there are no guide grooves at either side of the recording track 22. When the light spot S reaches the point c, the intensity of the reflected light beam is remarkably reduced to the level $I_1$ because of the existence of the prepit 23 and the short portions 21e of the guide grooves 21. When the light spot S moves to the point d, the intensity returns to the level $I_2$.

In the optical memory medium of this example, the reflected light beam obtained from the unpitted regions (i.e., the points b and d) which respectively are positioned in front of and in rear of the prepit 23 is greater than that obtained from the region (the point a) where the long portions 21c of two guide grooves 21, by $I_2—I_3$. Therefore, the difference in intensity ($I_2-I_1$) between the reflected light beam obtained from the point c at which the prepit 23 is formed and the reflected light beam obtained from the point b or d is great so that a reproduced signal of high quality can be obtained.

Example 5

Figure 10:
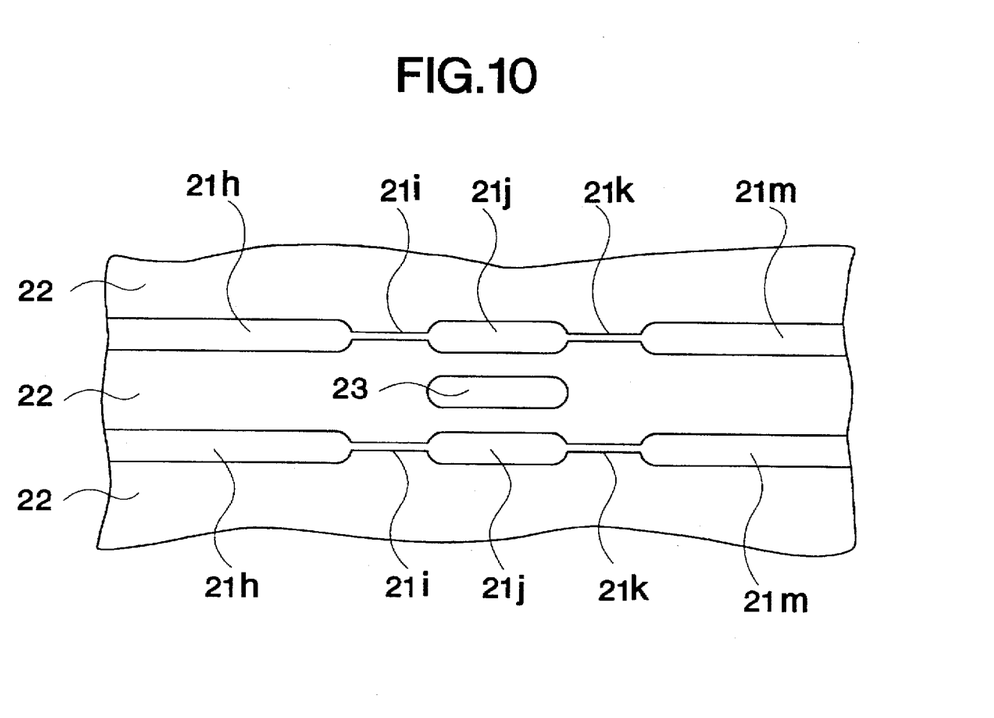
FIG. 10 is a plan view showing the preformat portion of the fifth embodiment of the invention.

As shown in FIG. 10, each guide groove 21 contains one or more long portions 21h in series, a narrow portion 21i, a short portion 21j, a narrow portion 21k and a long portion 21m. A prepit 23 is formed between the short portions 21j of two guide grooves 21 adjacent to each other. On both sides of the unpitted regions which are positioned in front of and in rear of the prepit 23, the narrow portions 21i and 21k of two guide grooves 21 adjacent to each other are disposed.

It is preferable to set the width of the long and short portions 21h, 21m and 21j to the value from 0.3 μm to 0.5 μm. The width of the narrow portions 21i and 21k is preferably set to 70% of the width of the long and short portions 21h, 21m and 21j, but is not restricted to it and can be selected from a wide range.

In this example, the intensity of the reflected light beam obtained from the prepit 23 is slightly decreased as compared with that of Example 4, because the narrow portions 21i and 21k of the guide grooves 21 are disposed in front of and in rear of the prepits 23. Because the width of the portions 21i and 21k is small, however, the degree of the decrease is suppressed so that the difference in intensity between the reflected light beam obtained from the prepit 23 and that obtained from the region where no prepit is formed is sufficiently great.

The configuration of this example is very effective when employed in an optical memory medium in which long prepits are to be formed.

Example 6

Figure 18:
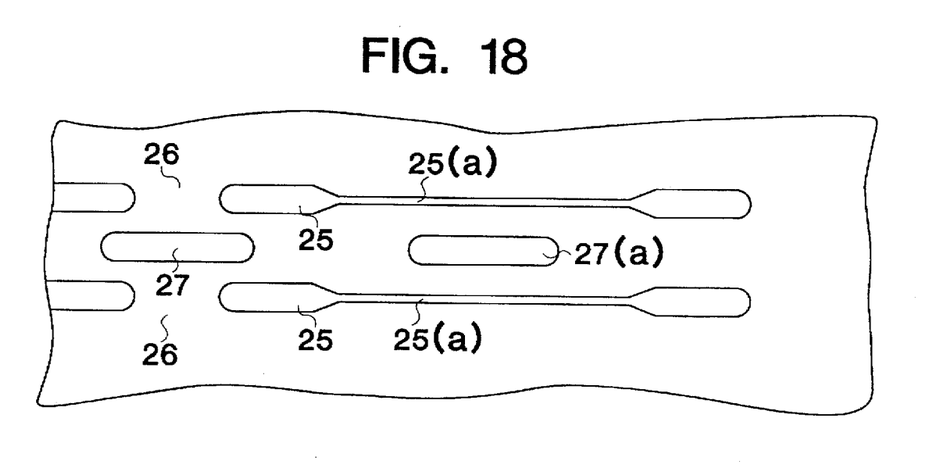
FIG. 18 is a plan view showing the preformat portion of a sixth embodiment of the invention.

As illustrated in FIG. 18, in another embodiment of the invention, each guide groove 25 has one or more narrow portions 25(a). The guide grooves are discontinuous as shown at 26. Some of the prepits 27, are sandwiched between the discontinuation portions while other of the prepits 27(a) are between two of the adjacent narrow portions 25(a).

It is possible that the configuration of Example 4 and that of Example 5 are both provided in one optical memory medium.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical memory medium comprising:

guide grooves and prepits, said guide grooves are formed discontinuously,, and each one of said prepits is sandwiched only between two of the discontinuous portions of guide grooves adjacent to each other;

wherein said discontinuous portions are longer than the prepit which is sandwiched between said discontinuous portions; and a light beam for obtaining recorded information from the optical recording medium scans substantially alone a center line of the respective prepits.

2. An optical memory medium comprising: guide grooves and prepits, said guide grooves have one or more narrow portions, and each one of said prepits is sandwiched only between two of said narrow portions of guide grooves adjacent to each other.

3. In an optical memory medium comprising guide grooves and prepits, said guide grooves are formed discontinuously and have one or more narrow portions, and some of said prepits are sandwiched between, two of the discontinuous portions of guide grooves adjacent to each other, and the other of said prepits are sandwiched between two of said narrow portions of guide grooves adjacent to each other.

4. An optical memory medium according to claim 2, wherein said narrow portions are longer than the prepit which is sandwiched between said narrow portions.

5. An optical memory medium according to claim 3, wherein said narrow portions are longer than the prepit which is sandwiched between said narrow portions.

6. An optical memory medium comprising:

guide grooves and prepits wherein, said guide grooves have one or more long portions, one or more short portions, and unpitted portions formed between said long and short portions, and each of said prepits is sandwiched between two of said short portions of the guide grooves adjacent to each other; and a light beam for obtaining recorded information from the optical recording medium scans substantially along the center line of the respective prepits.

7. In an optical memory medium comprising guide grooves and prepits, said guide grooves have one or more long portions, one or more short portions, and narrow portions formed between said long and short portions, and each of said prepits is sandwiched between two of said short portions of guide grooves adjacent to each other.

8. An optical memory medium comprising:

guide grooves and prepits, said guide grooves are formed discontinuously, and each one of said prepits is sandwiched only between two discontinuous portions adjacent to each other; and wherein the length of each continuous portion is equal to the length of a prepit; and a light beam for obtaining recorded information from the optical recording medium scans substantially along a center line of the respective prepits.

9. The optical memory medium according to claim 2, wherein each one of said prepits has a length which is greater than its width.

10. The optical recording medium according to claim 6, wherein the long and short portions are substantially the same width.

11. The optical memory medium according to claim 7, wherein the space between adjacent narrow portions and long portions is unpitted.

12. The optical recording medium according to claim 7, wherein the long and short portions are substantially the same width.

13. The optical memory medium according to claim 1, wherein said prepits record prerecorded information.

14. The optical recording medium according to claim 13, wherein said prerecorded information includes at least one of a track address and a synchronizing signal.

15. The optical recording medium according to claim 13, wherein said prerecorded information includes at least a sector address.

16. The optical memory medium according to claim 6, wherein said prepits record prerecorded information.

17. The optical recording medium according to claim 16, wherein said prerecorded information includes at least one of a track address and a synchronizing signal.

18. The optical recording medium according to claim 16, wherein said prerecorded information includes at least a sector address.

19. The optical recording medium according to claim 6, wherein said short portion of said guide groove is provided along the same center line as the adjacent long portion of said guide groove in a circumferential direction.

* * * * *